United States Patent [19]

Johansson

[11] 4,183,229
[45] Jan. 15, 1980

[54] FLEXIBLE COUPLING

[75] Inventor: Carl E. Johansson, Le Lavandou, France

[73] Assignee: SKF Industrial Trading and Development Company B.V., Nieuwegein, Netherlands

[21] Appl. No.: 814,399

[22] Filed: Jul. 11, 1977

[30] Foreign Application Priority Data

Jul. 9, 1976 [NL] Netherlands ............... 7607603

[51] Int. Cl.² .................................... F16D 3/64
[52] U.S. Cl. ..................................... 64/14; 64/7
[58] Field of Search ................... 64/14, 9 A, 7, 21

[56] References Cited

U.S. PATENT DOCUMENTS

| | | | |
|---|---|---|---|
| 1,324,315 | 12/1919 | Lavigne | 64/7 |
| 2,182,455 | 10/1937 | Smith | 64/7 |
| 2,313,279 | 3/1943 | Suczek | 64/7 |
| 2,615,317 | 10/1952 | Rzeppa | 64/9 A |
| 3,107,505 | 10/1963 | Koss | 64/7 |
| 3,934,429 | 1/1976 | Takahashi | 64/21 |
| 3,935,717 | 2/1976 | Welschof | 64/21 |
| 3,946,576 | 3/1976 | Johansson | 64/14 |
| 3,977,212 | 8/1976 | Johansson | 64/14 |
| 4,020,648 | 5/1977 | Krude | 64/21 |
| 4,020,650 | 5/1977 | Krude | 64/21 |

FOREIGN PATENT DOCUMENTS 1430152  3/1976  United Kingdom ............ 64/14

Primary Examiner—Charles J. Myhre
Assistant Examiner—R. C. Turner
Attorney, Agent, or Firm—Daniel M. Rosen

[57] ABSTRACT

A flexible coupling comprises first and second coupling halves, at least a part of the first being inserted into the other, and the two coupling halves being linked together for transmission of power by means of resilient elements, these elements being surrounded over most of their surface and precompressed by the coupling halves.

7 Claims, 2 Drawing Figures

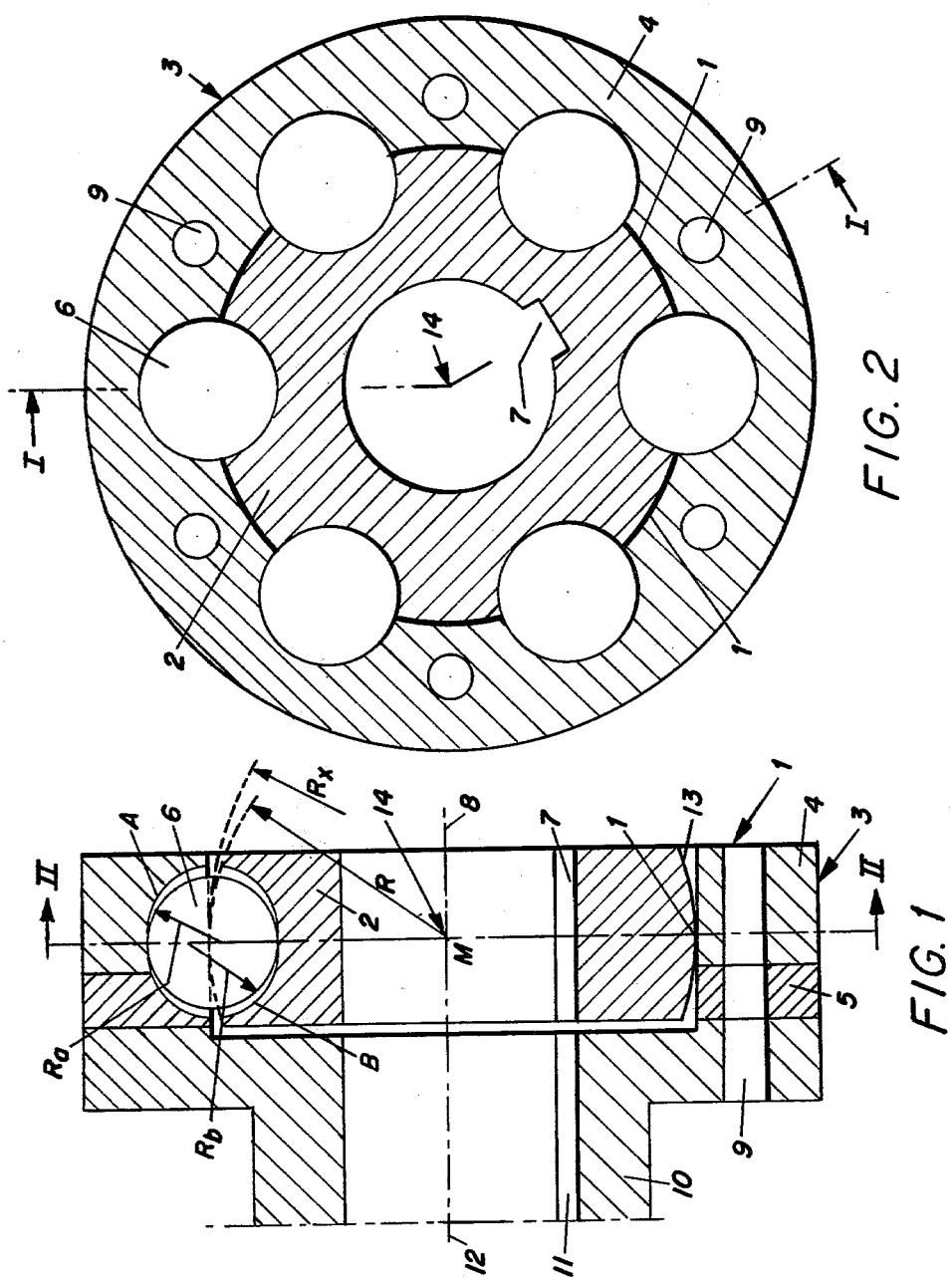

FLEXIBLE COUPLING

BACKGROUND OF THE INVENTION

This invention relates to flexible couplings comprising coupling halves linked together via intermediate resilient elements, generally as disclosed in U.S. Pat. No. 3,977,212. Typically, the coupled machined parts require extremely accurate mutual alignment. Also, in such couplings, the resilient material may become indented, which leads to imbalance of the device. These and other disadvantages of the prior art couplings are overcome by the present invention.

SUMMARY OF THE INVENTION

The new coupling offers advantages in respect of assembly and disassembly. The coupled machine parts or the like no longer require extremely accurate mutual alignment, because incomplete alignment of the drive and driven shafts to be coupled has little if any effect on power transmission. While retaining the abovementioned advantages the invention provides means by which the direct transmission to the resilient elements, for example, of a load pressing on the coupling, such as a fly-wheel linked via the coupled shafts, is effectively prevented.

According to the invention at least one of the mutually opposed surfaces of the two coupling halves is designed with a longitudinal curvature, such that the two coupling halves are in mutual contact along at least one interrupted line of contact. This measure also prevents indentation or pressing of the resilient elements when two interconnected shafts are misaligned. Since it is no longer possible for the resilient elements to be indented, the occurrence of an extra imbalance inherent in the design is also prevented. This kind of imbalance can be the result of possible differences in elasticity between the various resilient elements and, for example, in the off position, from asymmetric location of these elements in relation to the mid-plane of the coupling perpendicular to the longitudinal direction.

According to a further embodiment of the invention, an advantageous contact between the two coupling halves is obtained when a curved surface is given a convex curvature. The best adaptability to misalignment of two shafts is obtained, according to the invention, by shaping a curved surface symmetrically with respect to its mid-plane perpendicular to the longitudinal direction.

According to a preferred embodiment of the invention the advantages are simply and effectively realized, by the curved surface being located on the part of one of the coupling halves which is inserted into the other half and forms part of a sphere, with the center preferably lying on the center line of the coupling half and in the mid-plane perpendicular thereto.

Optimum loading of the resilient elements and operation of the coupling are achieved when the radius R of the sphere is chosen such that the product of the area of the power-transmitting surface between a resilient element and one coupling half and the average radius of that surface is the same as the product of the area of the power-transmitting surface between that resilient element and the other coupling half and the average radius of the latter surface.

A flexible coupling according to the invention will now be described more in detail with reference to the accompanying drawings.

BRIEF DESCRIPTION OF THE DRAWINGS

FIG. 1 shows a longitudinal section of the flexible coupling taken along the line I—I in FIG. 2; and FIG. 2 is an extended, transverse sectional view taken along the line II—II in FIG. 1.

DETAILED DESCRIPTION OF THE PREFERRED EMBODIMENT

FIG. 1 shows a coupling 1 provided with two coupling halves or members 2 and 3, the coupling half 3 being composed of two parts 4 and 5. The two coupling halves 2 and 3 are mutually coupled for power transmission by resilient elements 6, such as rubber balls. Coupling half 2 is provided with a key slot 7 to effect a connection between that coupling half and a shaft (not shown) having axis 8.

Coupling half 3 consisting of parts 4 and 5 is provided with holes 9 for receiving set screws (not shown) whereby this coupling half can be connected to a machine element 10. With the aid of a key-way 11 in element 10 coupling half 3 connected to element 10 can be coupled to a shaft (not shown) having axis 12.

The inner coupling half 2 has an outer surface 13 of convex curvature which forms a segment of a sphere with center 14. The diameter of the sphere is almost the same as the internal diameter of the outer coupling half 3, such that the coupling halves 2 and 3 make mutual contact along an interrupted line (see FIG. 2). The diameter of the sphere is preferably selected such that on rotation of the coupling, the area of the power-transmitting bowl-shaped surface A between the element 6 and the coupling half 3 multiplied by the mean radius $R_a$ of that surface is the same as the product of the area of the power-transmitting bowl-shaped surface B between element 6 and coupling half 2 and the mean radius $R_b$ of the latter surface. Each pair of bowlshaped surfaces A and B are cavities which together define a pocket for containing one resilient element 6.

It is evident that within the scope of the invention many modifications and variants are possible. Thus, for example, instead of the outer surface 13 of coupling half 2, the annular inner surface of coupling half 3 can have a convex curvature. In case line contact L is insufficient in relation to the forces exerted in the off position for example, then the contact effected according to the invention can be simply increased by changing the convex shape of coupling half 2 and corresponding concave shape of coupling half 3, for example, by making these essential components according to a spherical surface of different radius $R_x$. For further simplification of assembly the construction with a subdivided part 4, as disclosed in the Dutch patent application No. 73.06658 can also be used.

What is claimed is:

1. In a flexible coupling including first and second members, the first member having an outer generally circular first surface about a first axis the second member having an inner generally circular second surface about a second axis and adjacent and radially outward of said first surface, each of said surfaces including a plurality of spaced-apart generally hemispherical cavities, each of said cavities of one surface being adjacent and facing one corresponding cavity in the other surface, each pair of opposing cavities thus defining a pocket, a plurality of resilient elements, each situated in one of said pockets, the improvement in combination therewith wherein, as seen in a sectional view of said coupling cut by a longitudinal plane through said first and second axes, said first surface defines a convex curve, said second surface defines a generally straight line, and said first surface contacts said second surface along a generally circular interrupted line extending circumferentially about said axes, said coupling permitting angular misalignment between the axes of said first and second members.

2. In a flexible coupling including first and second members, the first member having an outer generally circular first surface about a first central axis, the second member having an inner generally circular second surface about a second central axis, said second surface adjacent and radially outward of said first surface, each of said surfaces including a plurality of spaced-apart generally concave cavities, each of said cavities of one surface being adjacent and facing one corresponding cavity of the other surface, each pair of opposing cavities defining a pocket, a plurality of resilient elements each situated in one of said pockets, the improvement in combination therewith wherein, as seen in a sectional view of said coupling cut by a longitudinal plane through said first and second axes, one of said first and second surfaces defines a convex curve and the other of said surfaces defines a generally straight line, and said curve surface contacts said other surface along a generally circular interrupted line extending circumferentially about said axes, said coupling permitting angular misalignment between the axes of said first and second member.

3. A flexible coupling according to claim 2, wherein said curved surface is symmetrical relative to a transverse plane perpendicular to the central axis about which said curved surface extends, where said transverse plane is mid-length of said curved surface in the axial direction.

4. A flexible coupling according to claim 1 or 10, wherein said convex surface defines a partial sphere.

5. A flexible coupling according to claim 4, wherein said partial sphere has a spherical center located (a) on said central axis about which said spherical surface extends, and (b) in a transverse plane perpendicular to said central axis defined in (a) and mid-length of said spherical surface in the axial direction.

6. A flexible coupling according to claim 4, wherein each of said cavities defines a power-transmitting surface area that is generally hemispherical for engagement with one of said resilient elements, and for each pair of corresponding cavities of said first and second members respectively, said spherical surface of one of said members engaging the other member, has a radius of magnitude such that the product of the power-transmitting area of a cavity of the first member and the mean radius to its surface equals the product of the power-transmitting area and the mean radius to its surface of the cavity of the second member corresponding to the cavity of the first member.

7. A flexible coupling according to claim 2, wherein each of said resilient elements situated in one of said pockets between a pair of said cavities is in a compressed state.

* * * * *

UNITED STATES PATENT AND TRADEMARK OFFICE
CERTIFICATE OF CORRECTION

PATENT NO. : 4,183,229
DATED : January 15, 1980
INVENTOR(S) : Carl E. Johansson

It is certified that error appears in the above–identified patent and that said Letters Patent are hereby corrected as shown below:

Column 4, line 9, Change "10" to --2--.

Signed and Sealed this

Twenty-fourth Day of June 1980

[SEAL]

Attest:

SIDNEY A. DIAMOND

Attesting Officer     Commissioner of Patents and Trademarks